Aug. 22, 1950 M. H. SUSSIN 2,519,610
FILM HOLDER FOR PHOTO-PROCESS CAMERAS
Filed Sept. 30, 1946 5 Sheets-Sheet 1
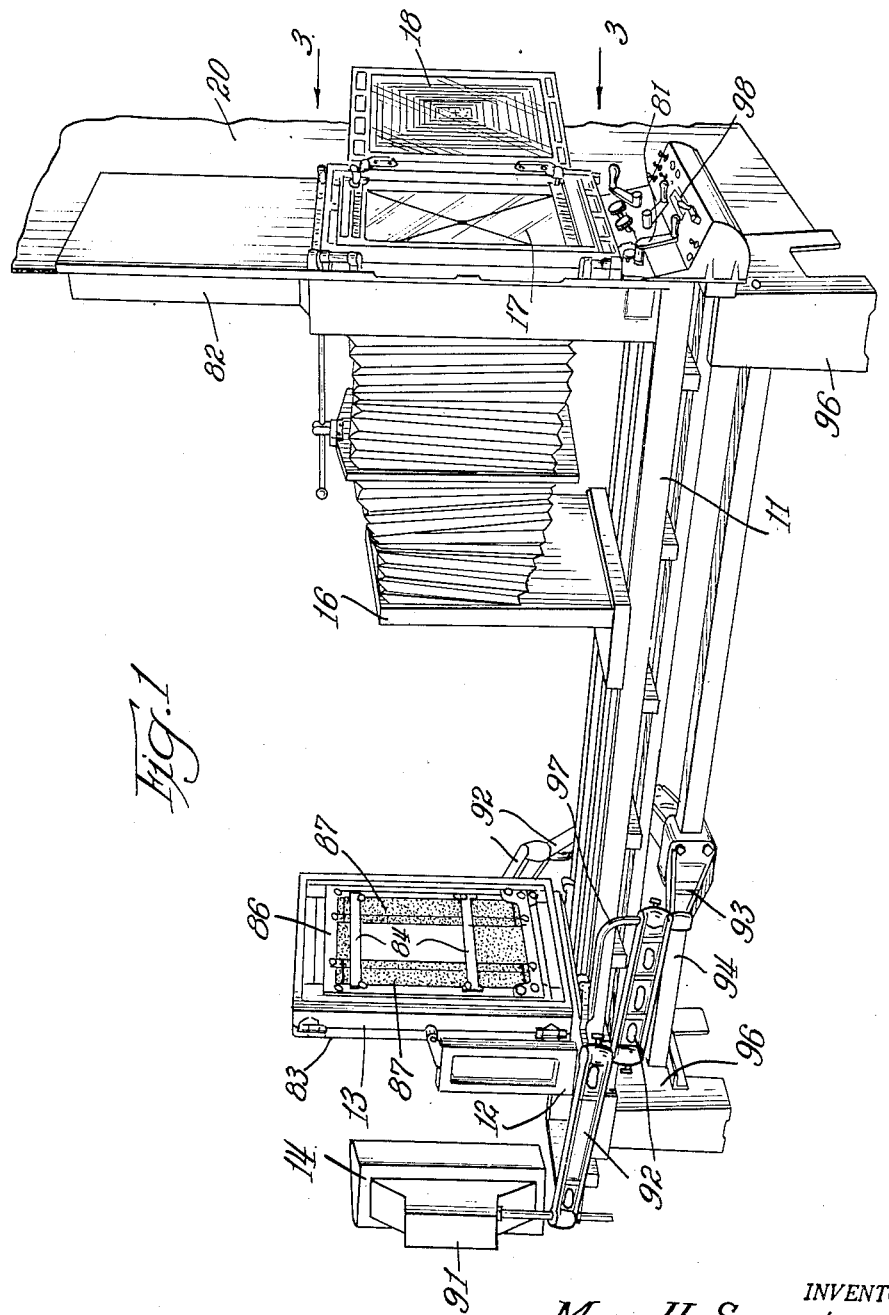
INVENTOR.
Max H. Sussin
BY
Louis Robertson
Atty.

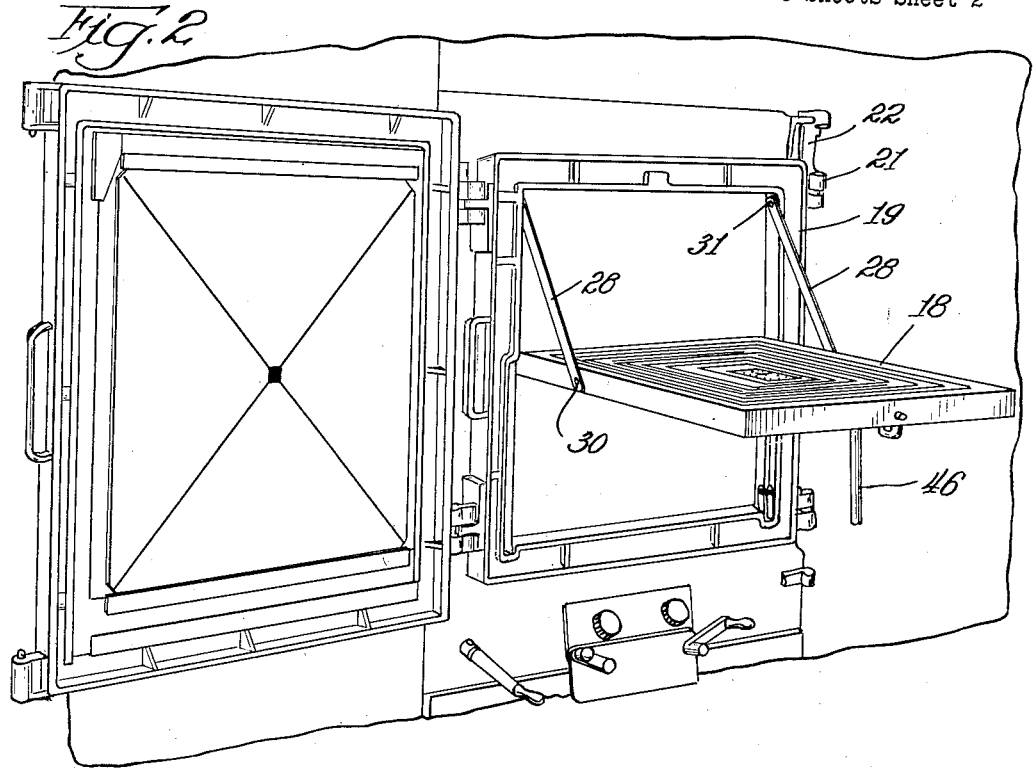
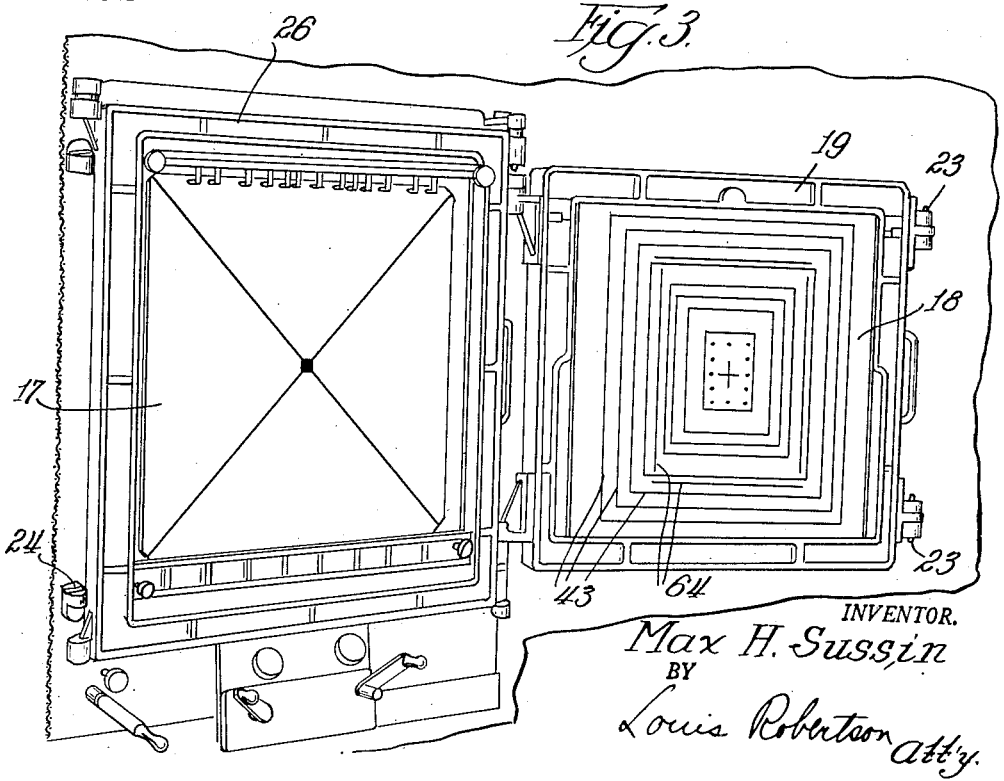

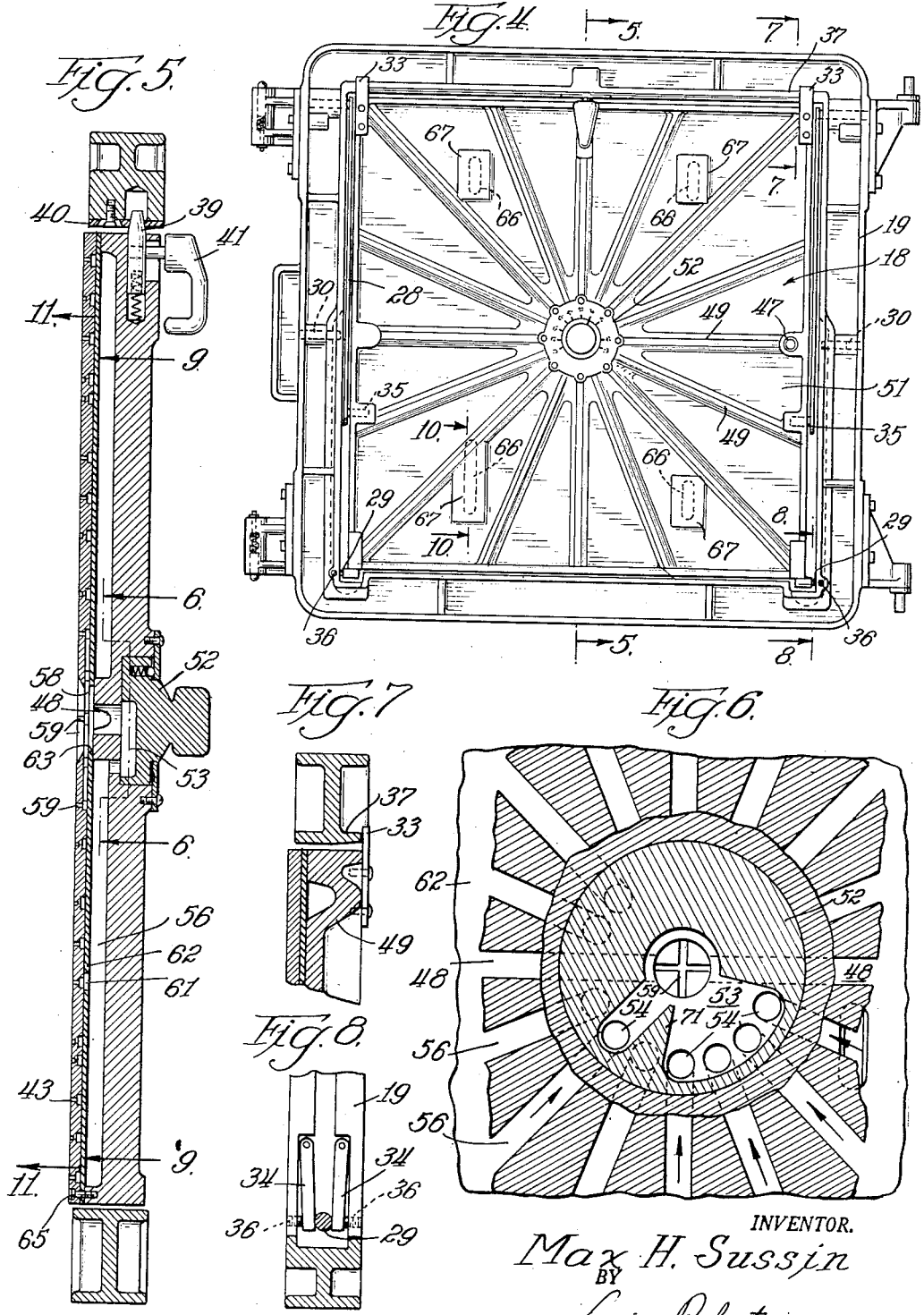

Aug. 22, 1950 M. H. SUSSIN 2,519,610
FILM HOLDER FOR PHOTO-PROCESS CAMERAS
Filed Sept. 30, 1946 5 Sheets-Sheet 4
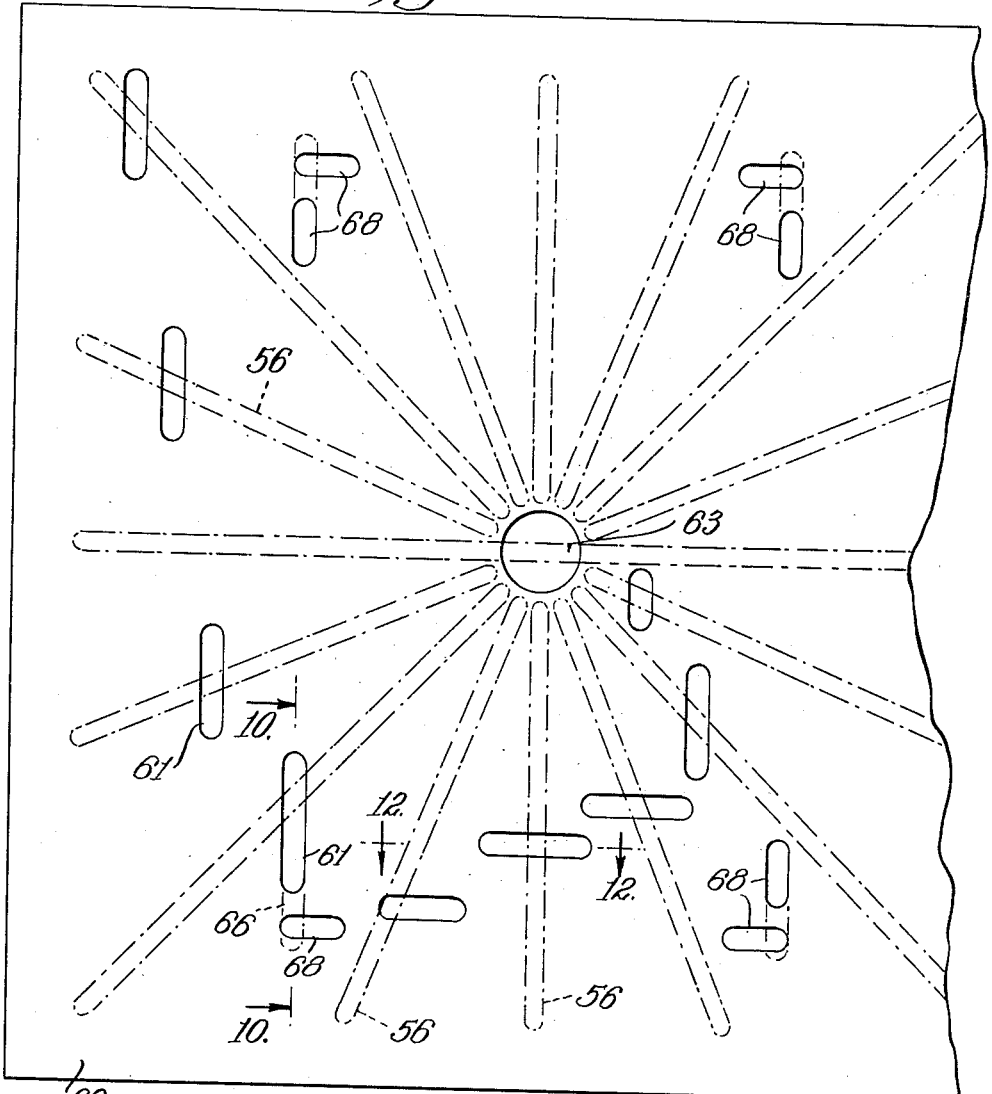
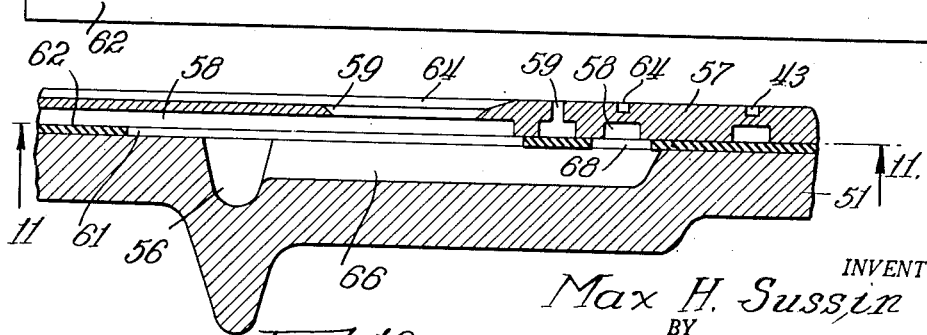
INVENTOR.
Max H. Sussin
BY
Louis Robertson att'y.

Aug. 22, 1950  M. H. SUSSIN  2,519,610
FILM HOLDER FOR PHOTO-PROCESS CAMERAS
Filed Sept. 30, 1946  5 Sheets-Sheet 5
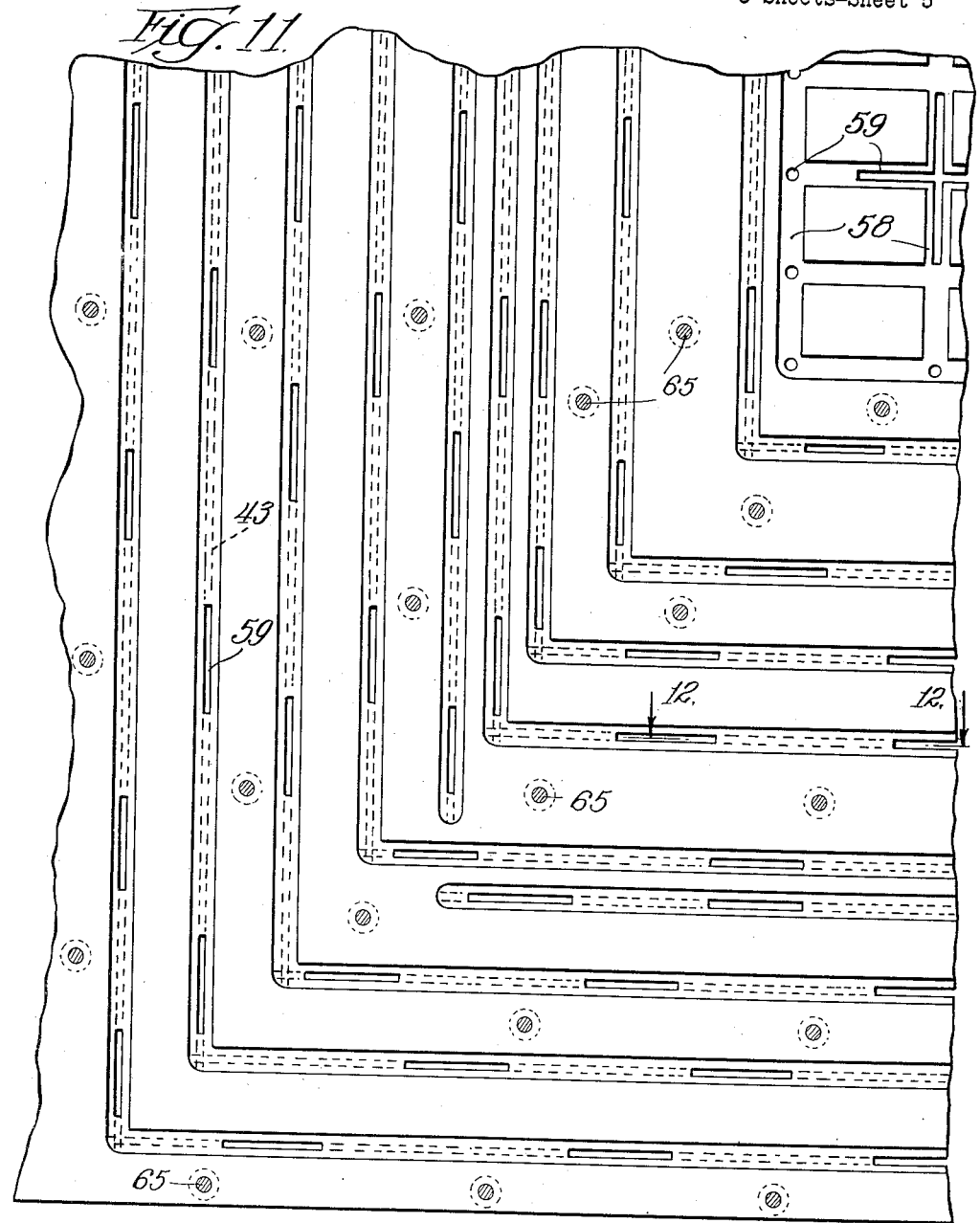
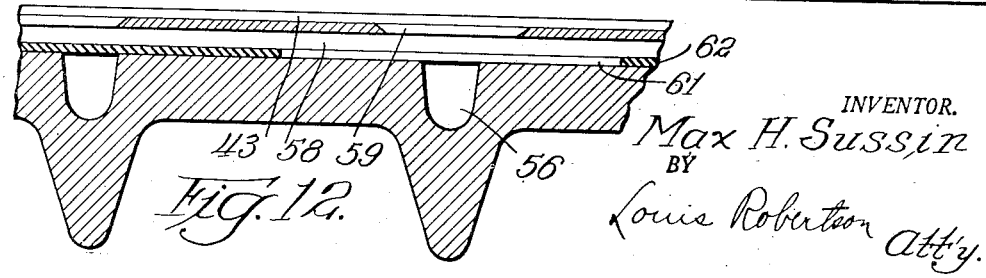
INVENTOR.
Max H. Sussin
BY
Louis Robertson Att'y Patented Aug. 22, 1950

2,519,610

UNITED STATES PATENT OFFICE 2,519,610

FILM HOLDER FOR PHOTO-PROCESS CAMERAS

Max H. Sussin, Chicago, Ill., assignor to Benjamin Sugarman, Chicago, Ill.

Application September 30, 1946, Serial No. 700,294

9 Claims. (Cl. 88—24)

Photo-process cameras used in photo-engraving, lithography, and other photo-mechanical reproduction, are sometimes called process cameras, or photo-engraving cameras. In such cameras the film is conventionally held flat in a vertical position, preferably by a vacuum plate which, in the industry, is called a vacuum back. The term vacuum board is usually used in this application because it is possibly broader and more descriptive. The vacuum board comprises a convenient way of holding the film flat in the focal plane with the least amount of time required for applying and removing the film. Furthermore, there is no optical interference, such as there would be if the film were pressed from the rear against a glass plate in front of it. The vacuum board arrangements have not been ideal heretofore.

Because of the vertical dispositioning of the vacuum boards, it has been necessary to exercise extreme care in placing the film thereon. The vacuum board has sometimes been hinged at its bottom to the camera, but when swung open it is then in the way for other operations. Therefore, the vacuum board usually has been hinged to swing about a vertical axis so that even when opened away from the camera, it retained its vertical disposition.

The films used have wide variations in size. The film might be only one-tenth of the size of the vacuum board, whereas the next one might occupy the whole area. It is desirable that the film be held close to its edges so as to prevent the film from curling adjacent the edges. Some vacuum boards have, therefore, been provided with a series of narrow openings with the vacuum always connected to all of the openings, those beyond the film being covered with masking paper to hold the vacuum. Other vacuum boards have tried some such clumsy expedients as providing a series of frame-like narrow slots of successively larger overall sizes, each being connected to a separate coupler or sleeve so that the vacuum hose could be connected to only one of the frames at a time. This construction was expensive to manufacture and nevertheless awkward to operate. Also, there was one popular film size differently proportioned from the rest for which no adequate provision was made.

According to the present invention, the difficulties of the vertically disposed vacuum board are overcome while satisfying all of the advantages of the vertically disposed hinges by providing a door frame which is hinged with vertically disposed hinges in the conventional way, but mounting the vacuum boards on the frame in such manner that the vacuum board may be tilted to a horizontal position. This is accomplished with extreme simplicity and in a manner to facilitate operation by having the vacuum board swing to a position approximately midway of the height of the door so that the center of gravity of the vacuum board is not raised or lowered very much and, hence, counterbalancing is unnecessary. The mounting is such that the vacuum board becomes biased toward each of its extreme positions as it approaches said position. In addition, the vacuum board is provided with a simple valve which connects the vacuum hose to a small center slot-frame and simultaneously to any desired successively larger slot-frame. Thus, by merely twisting the knob, the vacuum may be connected to any slot frames necessary to hold the film tight against the vacuum board while disconnecting the vacuum from those slot frames which are entirely beyond the film, so that little or no air will drain into the vacuum system once the film has been drawn flat on the board. Provision is also made for the film shape which was not previously accommodated.

In spite of the movability of the vacuum board, it is returned accurately to its proper position to place the film emulsion in the correct focal plane of the camera.

Additional objects and advantages of the invention will be apparent from the description and from the drawings in which:

Figure 1 is a perspective view of a photo-process camera which has been chosen for illustration of the invention;

Figure 2 is a fragmentary perspective view of the film holder which is the seat of the present invention, together with associated parts;

Figure 3 is a view similar to Figure 2 but showing the film holder swung to vertical position and its carrying door opened;

Figure 4 is a rear view of the film holder and its carrying door;

Figure 5 is a vertical sectional view taken approximately on the line 5—5 of Figure 4, but on a larger scale;

Figure 6 is a fragmentary sectional view taken approximately on the broken line 6—6 of Figure 5, showing particularly a cross section of the valve, but on a larger scale;

Figure 7 is a fragmentary vertical sectional view taken on the line 7—7 of Figure 4, but on the scale of Figure 5;

Figure 8 is a corresponding view taken on the line 8—8 of Figure 4;

Figure 9 is a fragmentary face view of a gasket member used in connection with the valving operation, the dotted lines showing the positions of slots in the back plate of the film holder;

Figure 10 is a fragmentary cross sectional view taken through the entire film holder approximately on the line 10—10 of Figure 9, but on full scale which will be printed at approximately three-fifths scale;

Figure 11 is a fragmentary back view of the face plate of the film holder on the same scale as Figure 6; and Figure 12 is a view corresponding to Figure 10, but taken approximately on the line 12—12 of Figure 9.

Although the law requires a full and exact description of at least one form of the invention, such as that which follows, it is, of course, the purpose of a patent to cover each new inventive concept therein no matter how it may later be disguised by variations in form or additions of further improvements; and the appended claims are intended to accomplish this purpose by particularly pointing out the parts, improvements, or combinations in which the inventive concepts are found.

General description of camera

The invention has been illustrated in conjunction with a photo-engraving camera of the dark room type. A camera bed 11 is provided with a copy holder carriage 12 on which a copy holder 13 is mounted. The films are illuminated by lamps 14 and are filmed through a lens carried on a lens board 16 movable on the bed 11. The lens of lens board 16 focuses an image of the copy either on ground glass 17 or on a film carried by a film holder 18, but which during exposure of the pictures is swung to the position of the ground glass 17 in Figure 1. The film holder 18 and the ground glass 17 are preferably located within a dark room built to receive the film end of the camera, an opaque flexible curtain 20 bridging between the film end of the camera and the walls of the dark room to shut off all light from the outside.

The present invention relates particularly to the film holder 18 and its mounting.

Mounting of film holder

The general nature of the mounting of the film holder 18 is seen best in Figures 2 and 3. The film holder 18 is carried by a film holder door frame 19 which is hinged by hinges 21 to the right side of the camera case 22. The hinge 21 preferably includes rolling bearings and the position to which the door frame closes is accurately determined by tapered spring detents 23 which engage slots in latch brackets 24 carried by the camera case. When the door frame 19 is swung to the open position, as seen in Figure 3, the ground glass 17 may be swung to the same focal plane as previously occupied by the face of the film holder 18. The ground glass 17 is carried by a door frame 26 which is hinged to the left side of the camera case 22, being otherwise mounted and latched to the camera case in a manner similar to that described with respect to film door frame 19.

The foregoing is generally in accordance with the form of mounting which has heretofore been preferred. It is important to be able to swing both the film holder and the ground glass aside to give access to a half-toning screen (not shown) and other parts positioned adjacent the focal plane. Nevertheless, it is inconvenient to apply the film to the film holder in this position. At least one camera maker has accordingly hinged the entire film holder or frame at its bottom, and provided a means for completely removing it to provide greater access to other parts at the focal plane. On account of the weight and size of the film holder, such removal is not a satisfactory solution to the problem.

According to the present invention, the film holder 18 is made separate from its door frame 19 and is mounted so that, as seen in Figure 2, it may be swung to a horizontal position. Thus the present mounting of the film holder 18 combines all the advantages of the various former mountings. It can be swung to the horizontal position for placing films thereon, and it can be swung aside with its frame to give access to the mechanism inside of the camera case.

According to the preferred form of mounting of the film holder 18 with respect to its door frame 19, it is largely self-counterbalancing and it, nevertheless, is biased toward each of its extreme positions as it approaches said position. This is accomplished largely through mounting the film holder 18 by links 28, which are pivoted to the film holder slightly below its center of gravity, and to the door frame even with the top of the film holder. The positioning of the pivots, which has been found satisfactory, is seen in Figure 4.

The bottom of the film holder 18 is provided with outwardly extending pins 29, which confine the movement of the bottom edge of the film holder approximately to a vertical plane, and limits its upward movement by striking stops 30. As a result, the film holder 18, in and near the position shown in Figure 2, is biased to this position by virtue of the greater weight of the normally upper end of the film holder rather than the normally lower end with reference to the pivots 35. However, as the film holder 18 approaches the vertical position, its weight becomes relatively much more effective than the difference in weight between the upper and lower portions of the film holder 18, so that the film holder is then biased to move downwardly and to swing the links 28 inwardly with respect to their upper pivots 31. Thus, the film holder is biased toward its vertical position when near that position.

It is important that the film holder always have its face in exactly the same plane when it is moved to the vertical position. It would be difficult to accomplish this with reliance primarily on the links 28. Accordingly, those links are used with respect to the positioning only for furnishing vertical support. The plane of the face of film holder 18 is determined solely by the two pins 29 and pin 31.

The pins 29 must be accurately positioned in their bottom position, and the position should be adjustable in order to set the position of the focal plane accurately during the original installation of the equipment. Accordingly, a pair of positioning fingers 34 is provided, which may be pivoted to the film door frame 19 and set to predetermine the positions by set screws 36, which, in turn, may be locked in any suitable manner. At their upper ends the positioning fingers 34 are slightly farther apart than the thickness of pin 29 carried by film holder 18, but the fingers 34 are adjusted so that they both engage the pin 29 in the lowermost position thereof. Thus, the pin 29 wedges itself between the fingers 34 so that its position is accurately and positively determined.

Inasmuch as both of the pins 29 at opposite sides of the door frame are thus accurately positioned, this determines two points of the plane, and only one more point need be determined accurately. This will be accomplished by a tapered spring latch 39, seen best in Figure 5, which seats on the front and rear sides of a hole in a plate 40, the plate being adjusted at the factory to align the face of the film holder 18 correctly. As the film holder 18 closes, it is stopped slightly beyond the correct position by stop fingers 33, which strike seat 37 on the door frame.

To swing the film holder to horizontal position, it is merely necessary to pull down the handle 41, and pull outwardly on it. With the particular mounting illustrated, the film holder is sufficiently counterbalanced within itself at all times, so that no great force is required to open or close the film holder.

Vacuum frame selection

As seen in Figure 3, the face of the film holder 18 is provided with numerous rectangular slots or grooves 43 which, for convenience, may be called frame slots or vacuum frames. Slots of this general nature have been conventional heretofore. The usual practice has been to have all of the slots connected to the vacuum. In placing the film on the film holder, it would, of course, close off some of the slots. It was usually necessary to close off the other slots with a mask or masking paper, or the like, so that the vacuum would not be broken by the volume of air flowing through the slots beyond the film. This could be avoided by having an excessively large capacity vacuum system. It has also been partially avoided by a cumbersome arrangement in which each frame slot was provided with its separate nipple to which the vacuum hose could be attached. According to the present invention, the difficulty is solved by a simple valving system by which the vacuum hose can be connected to the desired frame slot as well as also being always connected to a central vacuum slot.

The vacuum hose 46 is connected to a nipple 47 on the back of the film holder 18. The nipple 47 is connected with a slot 48 (Figure 6) in one of the ribs 49 on the back of the back plate 51 of the vacuum holder. The slot 48 extends across the center of the rotary valve 52 so that it communicates with the cut-out area 53 through which air is drawn from valve ports 54 communicating with successive slots 56 in additional ribs 49. Inasmuch as these successive slots 56 communicate with different ones of the frame slots 43, it is apparent that by turning the rotary valve 52 to different positions, the vacuum can be selectively connected with different frame slots 43.

Film holder construction

The connecting of the different valve slots to the different slot frames is accomplished in a very simple manner. It should be mentioned first that the ribs 49 and the slots therein would be desirable even if no use were made of the slots. The ribs 49 are important for stiffening the back plate 51. The slots in these ribs are important for more uniform cooling of the back plate 51 after the casting thereof. Hence, the provision of the slots 48 and 56 does not represent any increase in the cost of the back plates 51.

The face plate 57, as seen best in Figures 10, 11 and 12, not only has the frame slots 43 on its front face but also has manifold slots 58 on its rear face, the two slots 43 and 58 communicating through numerous ports 59. In Figure 11, the slots 58 are shown in full lines as are the ports 59. The slots 43 being on the far side of the plate are seen only in dotted lines.

According to the present invention, the various distribution slots 56 are each connected with the correct manifold slot 58 by means correctly placed perforations 61 in a gasket 62. The correct placing of these openings is seen in Figure 9, which also shows their relationship to the distribution slots 56. It will be apparent that the gasket, lying between back plate 51 and face plate 57, prevents communication between the slots 56 and the manifold slots 58 except where the perforations 61 are provided, as seen in Figure 12, for example. However, a particular slot 56 will communicate through a particular perforation 61 with a particular manifold slot 58 which in turn will communicate through its various ports 59 with a particular frame slot 43. It is desirable that there always be vacuum behind the film at the center of the film holder. This follows not only from the fact that the film is always across the center so that there is never any need to shut off the vacuum from that point, but also from the fact that employing vacuum at that point overcomes a possibility that an outer vacuum frame will seal down the edges of the film and leave an air pocket at the center. For the foregoing reasons the gasket 62 is provided with a central cut-out 63 so that the slot 48 can communicate with the central manifold slot 58 which in turn communicates with the face of the film holder through its ports 59, some of which may be mere round holes. It is not necessary in this instance to provide a frame slot 43 on the front of the film holder. Screws 65 through face plate 54 seal gasket 62.

Disproportionate shape

Most of the film sizes commonly used are proportionate in shape so that their successive vacuum frames 43 may lie neatly outside of each other and easily be entirely independent. There is one common size, however, which is disproportionate with respect to the rest of them. In this case, therefore, the vacuum frame 64 is made disjointed, some parts of it being inside of an adjacent frame and others being outside of the same frame. In order that one of the distribution slots 56 may communicate with both parts of the vacuum frame 64, but not with the intervening vacuum frame 43, jumper slots 66 are provided, special formations 67 being cast on the back of the back plate 51 to form them.

As seen in Figure 10, one of the slots 66 communicates with the distribution slot 56 at a point where it also communicates with one of the apertures 61 in gasket 62. The slot 66 also communicates with a special aperture 68 in gasket 62 for communicating with the manifold slot 58 which in turn communicates with the frame slot 64. Because the other portions of special frame slot 64 have independent distribution slots 56, they are connected to one another by similar jumper slots 66, each of which communicates with two of the adjacent perforations 68.

Of course, it is important that with any film size a vacuum frame close to the edge thereof be connected with a vacuum. According to the present invention, vacuum frames or slots at the center of the film holder, and also some intervening vacuum frames are also connected to the source of vacuum. The intervening vacuum frames are connected by having the cut-out portion of the rotary valve 52 large enough to span a number of the valve ports 54. However, the rotary valve 52 is provided with a finger 11, which closes the valve port 54 adjacent to the one corresponding to the largest frame being connected to vacuum. This is necessary on account of the disproportionate frame 64. It is apparent that since part of this frame lies outside of the adjacent frame 43, while part lies inside of this adjacent frame 43, a valve which simultaneously connected the vacuum to both of these frames would fail to shut off all of the vacuum slots beyond the film when one of these disproportionate film sizes was being used.

From the foregoing it is seen that a film holder and mounting therefor have been provided, which are very much more convenient than any known heretofore. The film holder can be swung to a horizontal position for applying the film thereto, or with its door frame, which may be swung aside to give access to the mechanism inside of the camera case. The application of the film to the film holder is facilitated not only by a practical mounting for moving the film holder to a horizontal position, but also by the provision of a simple valving construction which facilitates disconnecting the vacuum from the frame slots beyond the film. This valving system works without masking with any of the proportionate film sizes commonly used and also with the one common disproportionate film size. Of course, more disproportionate film sizes could be accommodated by slight changes of construction following the teaching with respect to the one disproportionate film size.

Additional features

The camera illustrated in Figure 1 has additional features which I claim as my invention, although it is recognized that divisional applications will be necessary for their protection. The camera frame is provided with a crank 81 which turns a helical gear with a 45 degree helical angle. The gear meshes with a mating helical gear which may, for distinction, be called a worm wheel and which when rotated drives a pair of looped chains vertically extending along opposite sides of the screen rails to raise the photo-engraving screen into a housing 82 while lowering a compensating plate thereon. Upon turning the crank 81 in the other direction, the screen is lowered and the compensating plate raised. When the screen strikes a stop at the bottom of its movement, the rotary movement of the worm wheel is prevented and it is, therefore, thrust axially by continued rotation of the crank and associated helical gear thereon. This traversing movement of the worm wheel moves the screen toward the film holder until it strikes a micrometrically adjusted stop. The screen is kept parallel with the focal plane by a pantograph. If the crank is again turned in the first direction mentioned, the screen is moved toward the camera lens until it passes a guide roller which has been preventing its upward movement, and then it is moved upwardly as first described.

The copy holder 13 is pivoted with respect to the movable carriage 12 so that either face of the copy holder may be presented toward the lens. One face is provided with a hinged frame 83 carrying a glass plate against the inside of which copy is pressed by a suitable resilient backing.

The other face of the copy holder 13, shown in Figure 1, includes bars 84 which includes stops or rests which determine the focal plane against which the edges of transparencies or holders therefor are pressed by suitable spring fingers. The seat bars 84 are vertically adjustable and each draws with it from a spring roller a curtain 86. Likewise, curtains 87 may be drawn from the sides to block out substantially all of the light except that passing through the transparency. The stops or rests on positive bars 84, against which the plate is pressed, lie in the same plane, with the copy holder in the position shown, that the inside of the glass plate in cover 83 assumes when the copy holder 13 is swung over to present its other face toward the camera lens.

The hinged frame 83 and the glass plate therein are very heavy and are counterbalanced by suitable springs, so that when the copy holder 13 is stopped in an intermediate position with the frame 83 uppermost, the frame may easily be swung upwardly to insert copy beneath it. A latch is provided for holding the frame 83 closed, operated by either of two rigidly connected handles, and the carriage 12 includes a block or shoulder so positioned that one handle of the latch will lie alongside of it when either face of copy holder 13 is facing the camera lens, the shoulder preventing release of the latch, so that the cover is prevented from flying open.

For photographing transparencies a rectangle of felt padding is removed from inside of a glass cover 83 to expose a plate of opal glass, which, when illuminated by lamps 14, illuminates a transparency held by seat bars 84.

The camera is provided with a pair of lamps 91, only one of which is shown. Each of the lamps is carried by a pair of folding arms 92, one of which in turn is pivotally carried by a carriage 93. According to the present invention, the carriage 93 rolls on a monorail 94, which is carried independently of the camera bed 11 by shelf brackets 96. This manner of suspending the lamps positively prevents distortion of the camera bed due to shifting of the lamps. This makes it entirely practical to connect the carriage 93 to the carriage 12 by a loose link 97, so that the lamp carriage moves with the copy holder 13; again without there being any distortion of the camera bed 11. It should be mentioned that both the carriage 12 and the lens board 16 may be adjusted either from the outside of the dark room or from inside of the dark room, the dark room being built around the film holder 18 and associated parts of the camera, so that the copy holder 13 and lens board are outside of the dark room. The carriage 12 and lens board 16 each carries a pinion meshing with a rack along the middle of the bed 11, the associated part being moved by turning the pinion. For determining the correct positions of the copy holder 13 and lens board 16 two independent sets of scale tapes are provided, one set having its readings visible on the instrument board 98 in the dark room, and the other set having its scales visible adjacent to the copy holder 13 and lens board 16. This makes it convenient for a cameraman to adjust the positioning of the copy holder and lens board equally easily whether he is inside or outside of the dark room.

The lens board preferably includes three lenses, mounted on a turret so that each can be moved to operative position. Each is provided with a gear ring for operating its diaphragm, which moves into mesh with a driving gear as the lens is moved to operating position. The driving gear may be driven by a motor controllable from the dark room. The scale tapes for the lens board show correct calibrations for all of the lenses.

I claim:

1. A camera including a body portion, a vertically disposed frame hinged to the body portion to swing about a vertical axis, a vacuum board carried by the frame with vertical disposition during exposure of a film thereon, and movable with respect to the frame to a generally horizontal position for the reception of film, said vacuum board being hung from the frame by links pivoted below but near the center of gravity of the vacuum board whereby it partly counterbalances itself but tends to fall toward a horizontal position as it approaches said position, and means limiting its fall approximately to said position, said frame and board being provided with three plane-determining seats and tapered means effective as the vacuum board approaches the focal plane for forcing it to the plane determined by said seats.

2. A camera including a body portion, a vertically disposed frame hinged to the body portion to swing about a vertical axis, a vacuum board carried by the frame with vertical disposition during exposure of a film thereon, and movable with respect to the frame to a generally horizontal position for the reception of film, the entire weight of said vacuum board being carried by links pivoted to the frame about an axis adjacent the top of the frame and fixed with respect to the frame and pivoted to the vacuum board below but near the center of gravity of the vacuum board, and on a line offset outwardly from a vertical plane containing said axis, and means, effective when the vacuum board reaches an approximately horizontal position, for limiting the pivotal movement of the vacuum board with respect to said links so that as the upper part of the vacuum board is pulled outwardly and downwardly the board will come to rest against said limiting means approximately at the horizontal position.

3. A camera including a vertically disposed frame, a vacuum board carried by the frame with vertical disposition during exposure of a film thereon, and movable with respect to the frame to a generally horizontal position for the reception of film, the entire weight of said vacuum board being carried by links pivoted to the frame about an axis adjacent the top of the frame and fixed with respect to the frame and pivoted to the vacuum board below but near the center of gravity of the vacuum board, and on a line offset outwardly from a vertical plane containing said axis, and means, effective when the vacuum board reaches an approximately horizontal position, for limiting the pivotal movement of the vacuum board with respect to said links so that as the upper part of the vacuum board is pulled outwardly and downwardly the board will come to rest against said limiting means approximately at the horizontal position.

4. A camera including a vertically disposed frame, a vacuum board carried by the frame with vertical disposition during exposure of a film thereon, and movable with respect to the frame to a generally horizontal position for the reception of film, the entire weight of said vacuum board being carried by links pivoted to the frame about an axis adjacent the top of the frame and fixed with respect to the frame and pivoted to the vacuum board below but near the center of gravity of the vacuum board, and means, effective when the vacuum board reaches an approximately horizontal position, for limiting the pivotal movement of the vacuum board with respect to said links so that as the upper part of the vacuum board is pulled outwardly and downwardly the board will come to rest against said limiting means approximately at the horizontal position.

5. A camera including a vertically disposed frame, a vacuum board carried by the frame with vertical disposition during exposure of a film thereon, and movable with respect to the frame to a generally horizontal position for the reception of film, links carrying the entire weight of said vacuum board, pivoted to said vacuum board about a first axis below but near the center of gravity thereof and pivoted to the frame about a second axis remotely spaced vertically from the first axis and fixed with respect to the frame, and means effective when the vacuum board reaches an approximately horizontal position, for limiting the pivotal movement of the vacuum board with respect to said links so that as the upper part of the vacuum board is pulled outwardly and downwardly the board will come to rest against said limiting means approximately at the horizontal position.

6. A camera including a vertically disposed frame, a vacuum board carried by the frame with vertical disposition during exposure of a film thereon, and movable with respect to the frame to a generally horizontal position for reception of film, support means carried by the frame and movable with respect thereto; pivotal means rigid with the vacuum board and having a pivotal axis below but near the center of gravity of the vacuum board and pivotally carried by the support means for carrying the entire weight of the vacuum board, said support means being mounted to move the pivotal means outwardly from the frame to permit the lower end of the vacuum board to move along the frame as the board turns to the horizontal position and means, effective when the vacuum board reaches an approximately horizontal position, for limiting the pivotal movement of the vacuum board with respect to the support means and limiting the movement of the support means so that as the upper part of the vacuum board is pulled outwardly and downwardly, the board will come to rest against said limiting means approximately at the horizontal position.

7. A camera including a vertically disposed frame, a vacuum board carried by the frame with vertical disposition during exposure of a film thereon, and movable with respect to the frame to a generally horizontal position for reception of film, support means carried by the frame and movable with respect thereto; pivotal means rigid with the vacuum board and having a pivotal axis near the center of gravity of the vacuum board and pivotally carried by the support means for carrying the entire weight of the vacuum board, said support means being mounted to move the pivotal means outwardly from the frame to permit the lower end of the vacuum board to move along the frame as the board turns to the horizontal position and means, effective when the vacuum board reaches an approximately horizontal position, for limiting the pivotal movement of the vacuum board with respect to the support means and limiting the movement of the support means so that as the upper part of the vacuum board is pulled outwardly and downwardly, the board will come to rest against said limiting means approximately at the horizontal position.

8. A camera including a body portion, a vertically disposed frame, a vacuum board carried by the frame with vertical disposition during exposure of a film thereon, and movable with respect to the frame to a generally horizontal position for the reception of film, said vacuum board being hung from the frame by means so constructed that it partly counterbalances itself but tends to fall toward a horizontal position as it approaches said position, and means limiting its fall approximately to said position, said frame and board being provided with three plane-determining seats and tapered means effective as the vacuum board approaches the focal plane for forcing it to the plane determined by said seats.

9. A camera including a vertically disposed frame, a film holding board carried by the frame with vertical disposition during the exposure of the film thereon and movable with respect to the frame to a generally horizontal position for reception of film, co-operating guide means carried by the bottom of the board and by the frame for guiding the bottom of the board through upward movement while substantially preventing movement inwardly beyond its position during exposure of the film, and support means carried by the frame for supporting the board for outward and downward movement of the upper portion thereof, said support means supporting the board throughout its movement with its center of gravity approximately at its original height, and means for limiting the movement of the board so that as the upper part of the board is pulled outwardly and downwardly, the board will come to rest against the limiting means approximately at the horizontal position.

MAX H. SUSSIN.

REFERENCES CITED

The following references are of record in the file of this patent:

UNITED STATES PATENTS

| Number | Name | Date |
| --- | --- | --- |
| 661,840 | Baker | Nov. 13, 1900 |
| 1,209,419 | Farquhar | Dec. 19, 1916 |
| 1,401,902 | Fruwirth | Dec. 27, 1921 |
| 1,945,481 | Dilkes | Jan. 30, 1934 |
| 2,078,741 | Stenmark | Apr. 27, 1937 |
| 2,306,885 | Klemm | Dec. 29, 1942 |
| 2,376,416 | Campbell | May 22, 1945 |
| 2,379,279 | Costello | June 26, 1945 |